US009626354B2

(12) United States Patent
Feng

(10) Patent No.: US 9,626,354 B2
(45) Date of Patent: Apr. 18, 2017

(54) SYSTEMS AND METHODS FOR USING TONE INDICATOR IN TEXT RECOGNITION

(71) Applicant: LENOVO (Singapore) PTE, LTD., New Tech Park (SG)

(72) Inventor: Xin Feng, Arcadia, CA (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/160,011

(22) Filed: Jan. 21, 2014

(65) Prior Publication Data

US 2015/0205781 A1     Jul. 23, 2015

(51) Int. Cl.
| | | |
|---|---|---|
| G06F 17/27 | (2006.01) | |
| G06F 17/20 | (2006.01) | |
| G06F 17/22 | (2006.01) | |
| G06F 3/01 | (2006.01) | |

(52) U.S. Cl.
CPC ............ *G06F 17/275* (2013.01); *G06F 3/018* (2013.01); *G06F 17/2223* (2013.01); *G06F 17/2765* (2013.01); *G06F 17/2705* (2013.01)

(58) Field of Classification Search
None
See application file for complete search history.

(56) References Cited

U.S. PATENT DOCUMENTS

| | | | | |
|---|---|---|---|---|
| 5,680,510 A | * | 10/1997 | Hon ................... | G10L 15/142 704/255 |
| 6,636,163 B1 | | 10/2003 | Hsieh | |
| 2001/0044724 A1 | * | 11/2001 | Hon ................... | G06F 17/2715 704/260 |
| 2004/0025115 A1 | * | 2/2004 | Sienel ............... | G06F 17/30896 715/234 |
| 2006/0047386 A1 | * | 3/2006 | Kanevsky ............ | B60K 35/00 701/36 |
| 2008/0056578 A1 | * | 3/2008 | Shilman ............ | G06K 9/00436 382/186 |
| 2008/0270118 A1 | | 10/2008 | Kuo et al. | |
| 2009/0327948 A1 | * | 12/2009 | Penttinen .......... | H04M 1/72552 715/780 |
| 2012/0265527 A1 | * | 10/2012 | Xiong ..................... | G10L 15/08 704/235 |
| 2014/0244234 A1 | | 8/2014 | Huang et al. | |
| 2014/0354549 A1 | | 12/2014 | Huang et al. | |
| 2015/0088486 A1 | | 3/2015 | Barrett et al. | |
| 2016/0019201 A1 | | 1/2016 | Qian et al. | |

FOREIGN PATENT DOCUMENTS

JP        06175576        6/1994

OTHER PUBLICATIONS

U.S. Appl. No. 14/335,727 Office Action Summary, Dec. 31, 2015.
U.S. Appl. No. 14/335,727 Office Action Summary, May 23, 2016.
U.S. Appl. No. 14/335,727 Office Action Summary, Dec. 7, 2016.

* cited by examiner

*Primary Examiner* — Marcus T Riley

(74) *Attorney, Agent, or Firm* — Kunzler Law Group

(57) ABSTRACT

For using a tone indicator to determine a language for text recognition, an apparatus for using a tone indicator to identify language in text recognition is disclosed. The apparatus for text recognition using a tone indicator includes a text input module, a tone indicator module, and a language identification module. A method and computer program product also perform the functions of the apparatus.

20 Claims, 7 Drawing Sheets

SYSTEMS AND METHODS FOR USING TONE INDICATOR IN TEXT RECOGNITION

BACKGROUND

Field

The subject matter disclosed herein relates to text recognition and more particularly relates to systems, apparatuses, and methods for using a tone indicator to identify language.

Description of the Related Art

Touchscreen devices are popular and widely sold. Smartphones, tablet computers, and other touchscreen devices often lack a physical keyboard for textual input. As such, handwriting recognition software is gaining popularity as a way to input text into a touchscreen device. However, most handwriting recognition software is based on roman letters and languages that use the same, such as English.

Many East Asian languages are encoded digitally using a double-byte character set (DBCS), however handwriting software for these languages are limited. For example, software can identify and recognize a handwritten Chinese character, but cannot recognize a phonetic spelling of the same character that uses Latin script (roman letters), such as pinyin for Chinese, romaji for Japanese, or other Romanization systems, from English.

Additionally, when using a keyboard (either physical or on-screen) a user may input pinyin but cannot easily indicate a tone associated with the pinyin word. The same problem exists with Romanization of other tonal languages.

BRIEF SUMMARY

An apparatus for using a tone indicator to identify language in text recognition is disclosed. The apparatus for text recognition using a tone indicator includes a text input module, a tone indicator module, and a language identification module. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
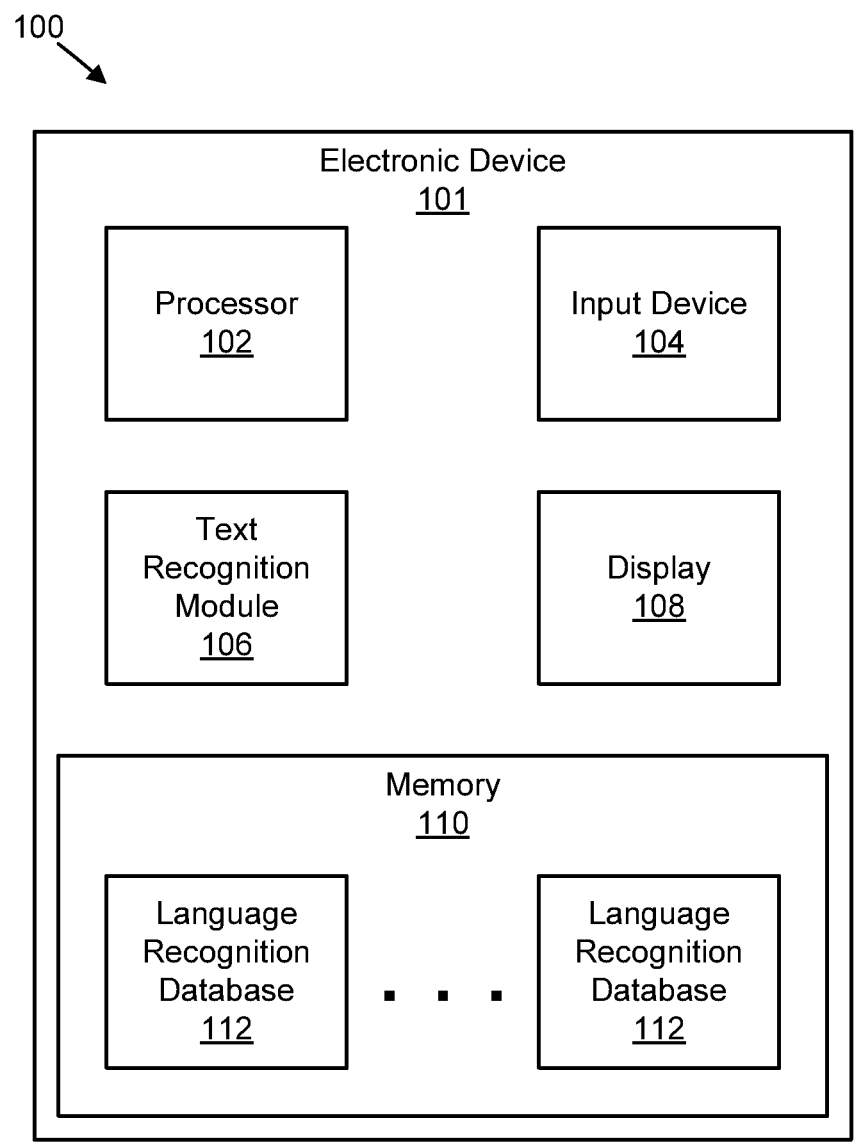
FIG. 1 is a schematic block diagram illustrating one embodiment of a system for text recognition using a tone indicator.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the systems, apparatuses, methods, and computer program products disclosed herein identify a tone indicator for use in text recognition. The text may be handwritten or typed. The tone indicator is used to select a language library for use in interpreting (e.g., recognizing) the text.

In some embodiments, the tone indicator is handwritten. In other embodiments, the tone indicator is typed. Examples of typed tone indicators include a numeral appended to a word. In some embodiments, the text is in a first language. In other embodiments, the text is in a second language. Examples of the first and second languages include, but are not limited to, English, Chinese, and Pinyin.

FIG. 1 depicts a system 100 for text recognition using a tone indicator, according to embodiments of the disclosure. The system 100 includes an electronic device 101. The electronic device 101 comprises a processor 102, an input device 104, a text recognition module 106, and a memory 110. In some embodiments, the electronic device 101 also includes display 108. The components of the electronic device 101 may be interconnected by a communication medium, such as a computer bus.

The processor 102 may comprise any known controller capable of executing computer-readable instructions and/or capable of performing logical operations on the input text. For example, the processor 102 may be a microcontroller, a microprocessor, a central processing unit (CPU), a graphics processing unit (GPU), an auxiliary processing unit, a FPGA, or similar programmable controller. In some embodiments, the processor 102 executes instructions stored in the memory 114 to perform the methods and routines described herein.

The input device 104 may comprise any known computer input device. For example, the input device 104 may be a touch panel, a button, a key, or the like. In some embodiments, the input device 104 may be integrated with the display 108, for example, as a touchscreen or similar touch-sensitive display. In some embodiments, the input device 104 comprises a touchscreen and text may be input by using a virtual keyboard displayed on the touchscreen and/or by handwriting on the touchscreen. In some embodiments, the input device 104 comprises two or more different devices, such as a physical keyboard and a touch panel.

The text recognition module 106 receives input text from the input device 104 and interprets the text using a language library or language recognition database. The text recognition module 106 may be comprised of computer hardware, computer software, or a combination of both computer hardware and computer software. For example, the text recognition module 106 may comprises circuitry, or a processor, configured to interpret the input text. As another example, the text recognition module 106 may comprise computer program code that allows the processor 102 to interpret the input text. The text recognition module 106 is discussed in further detail with reference to FIGS. 2 and 3, below.

The display 108 may comprise any known electronic display capable of outputting visual data to a user. For example, the display 108 may be an LCD display, an LED display, an OLED display, a projector, or similar display device capable of outputting images, text, or the like to a user. In some embodiments, the display 108 may be integrated with the input device 104, for example, as a touchscreen or similar touch-sensitive display. The display 108 may receive image data for display from the processor 102 and/or the text recognition module 106.

The memory 110 may be implemented as a computer readable storage medium. In the embodiment shown in FIG. 1, the memory 110 a plurality of language recognition databases 112. In certain embodiments, the language recognition databases 112 may be loaded into the memory 110 by a manufacturer or provider of the electronic device 101. In some embodiments, the language recognition databases 112 may be downloaded into the memory 110 by the user. In further embodiments, the electronic device 101 may contact a server or database via a network connection to download the language recognition databases 112. In some embodiments, the language recognition databases 112 comprise a default, or primary, database and one or more elective, or secondary, databases.

Each language recognition database may correspond to a particular language. For example, the memory 110 may contain language recognition databases 112 for English, Chinese, or other languages. When a user inputs text, the language recognition databases 112 are used to interpret the input text. For example, text recognition module 106 may perform handwriting recognition on the input text and the language recognition databases 112 may be searched during the handwriting recognition process to identify a symbol, character, or typed word corresponding to the input text.

Figure 2:
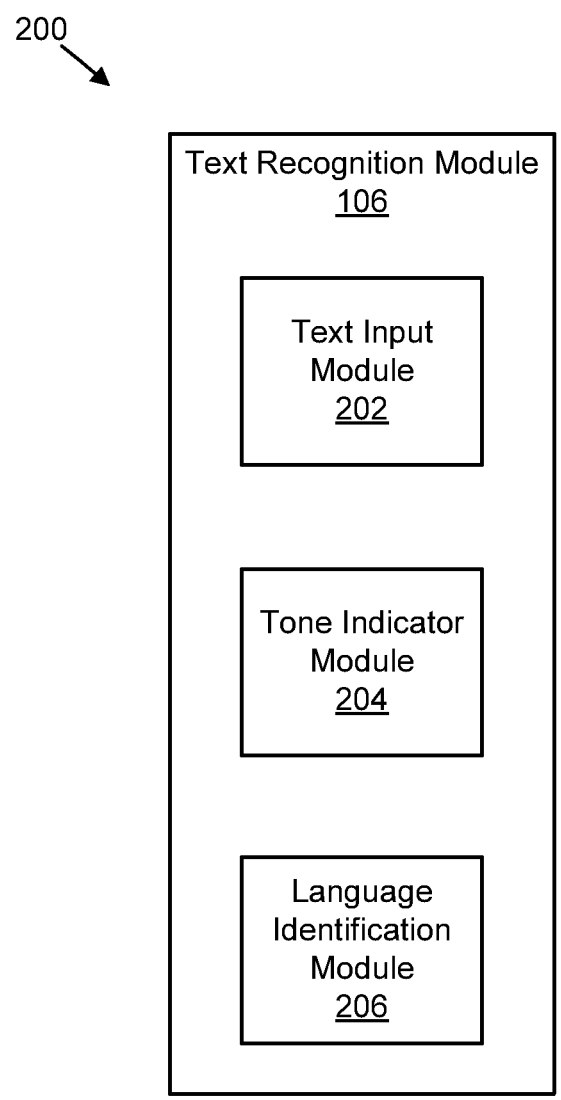
FIG. 2 is a schematic block diagram illustrating one embodiment of an apparatus for text recognition using a tone indicator.

FIG. 2 is a schematic block diagram illustrating one embodiment of an apparatus 200 for text recognition using a tone indicator, according to embodiments of the disclosure. Apparatus 200 comprises a text recognition module 106, such as the text recognition module 106 described above with reference to FIG. 1. In general, as described above, the text recognition module 106 may receive input text, determine a tone indicator associated with the input text, and select a language recognition database based on the determined tone indicator. In the embodiments of FIG. 2, the text recognition module 106 includes a text input module 202, a tone indicator module 204, and a language identification module 206.

The text input module 202, in one embodiment, is configured to receive input text from an input device, such as input device 104. In some embodiments, the text input module 202 received input from more than one input device and determines if input received from one input device should be associated with text received from another input device. For example, the text input module 202 may compare timestamps, positions, or other attributes of handwritten input received from a touch panel with text input received from a keyboard to determine whether the handwritten input should be associated with the text input. In further embodiments, the text input module 202 may associate a gesture or handwriting symbol with typed input.

In some embodiments, the text input module 202 processes all input and filters for text input. In response to detecting text input, the text input module 202 may determine if touch input (e.g., handwriting input or gesture input) should be associated with the detected text input. In certain embodiments, the text input module 202 receives input directly from the input device(s) 104. In certain embodiments, the text input module 202 receives the input text from a processor, such as processor 102. In further embodiments, the input text may be received from a networked device via the processor 102. For example, the electronic device 101 may be a server that receives text from other devices via wired or wireless connections, processes the input text, and returns results to the other devices.

In some embodiments, the text input module 202 differentiates between input text for which text recognition should be performed and commands. In certain embodiments, the text input module 202 only passes along text that is input into specific fields in, e.g., a graphical user interface (GUI) or webpage. For example, the text input module 202 may recognize and filter out web addresses or uniform resource locators (URLs) entered into an internet browser while passing along other text input into the internet browser. In certain embodiments, the text input module 202 only passes on text if certain programs, applications, and/or windows are running and/or active. For example, the text input module 202 may pass on text input into text messaging application and filter out text input into a command line application.

In some embodiments, the text input module 202 passes on input text only when certain characters are present. For example, the text input module 202 may only pass on input text that includes one or more roman letters and filter out input text that comprises solely numerals. In some embodiments, the text input module 202 filters out non-text symbols, e.g., punctuation marks, from the input text.

The tone indicator module 204, in one embodiment, is configured to process the input text to determine the presence of a tone indicator associated with the input text. The tone indicator may be a diacritic mark, a glyph or symbol added to a word or letter, a numeral added to an end of the word, a symbol added to an end of the word, a gesture input associated with the word, or the like. In certain embodiments, the tone indicator module 204 outputs an indication that a tone indicator is present to another module or device, such as the language identification module 206.

In some embodiments, the tone indicator module 204 identifies a particular tone associated with the input text. For example, in spoken Mandarin Chinese there are four tone used to clarify the meaning of the spoken word and phonetic writing systems for Mandarin Chinese use tone marks, or indicators, to indicate which tone is used when speaking the word. The tone indicator module 204 may identify the tone indicators to determine the particular tone associated with the word.

The tone indicator module 204 may examine each word of the input text for a tone indicator or may examine the entire input text as a whole. For example, where the input text is a phrase, the tone indicator module 204 may indicate the presence of tone indicators for the entire phrase or for each word of the phrase. In some embodiments, the tone indicator module 204 parses the input text to identify words. In other embodiments, the tone indicator module 204 receives parsed input text from another module, such as the text input module 202. In some embodiments, the tone indicator module 204 examines the parsed input text on a word-by-word basis to determine a tone indicator for each word. In other embodiments, the tone indicator module 204 examines the parse text in word groupings.

The language identification module 206, in one embodiment, is configured to select a language recognition library or database based on the tone indicator. In some embodiments, the presence of a tone indicator will cause the language identification module 206 to select a language recognition database associated with a language that uses tone, such as Chinese, pinyin, or other tonal languages. In some embodiments, where a tone is identified by the tone indicator module 204, the language identification module 206 will select a language recognition database or a language recognition sub-database that corresponds to the identified tone. Additionally, where no tone indicator is detected, the language identification module 206 may select a default language recognition database.

The language identification module 206 may select a language recognition database for each word of the input text or for the entire string of input text. For example, where the tone indicator module 204 examines parsed input text to determine a tone indicator, the language identification module 206 may select a language recognition database on a word-by-word basis. In some embodiments, where no tone indicator is detected for a word, the language identification module 206 may select a language recognition database based on tone indicators of nearby words. For example, the language identification module 206 may refer to language recognition databases selected for one or more words before and/or after the word having no tone indicator. If the nearby words contain tone indicators, a language recognition database may be selected based on the tone indicators of the nearby words. In certain embodiments, the mdoule206 may select a language recognition sub-database corresponding a neutral tone (i.e., without a tone indicator). However, if the nearby words do not contain tone indicators, then the language identification module 206 may select a default database.

Figure 3:
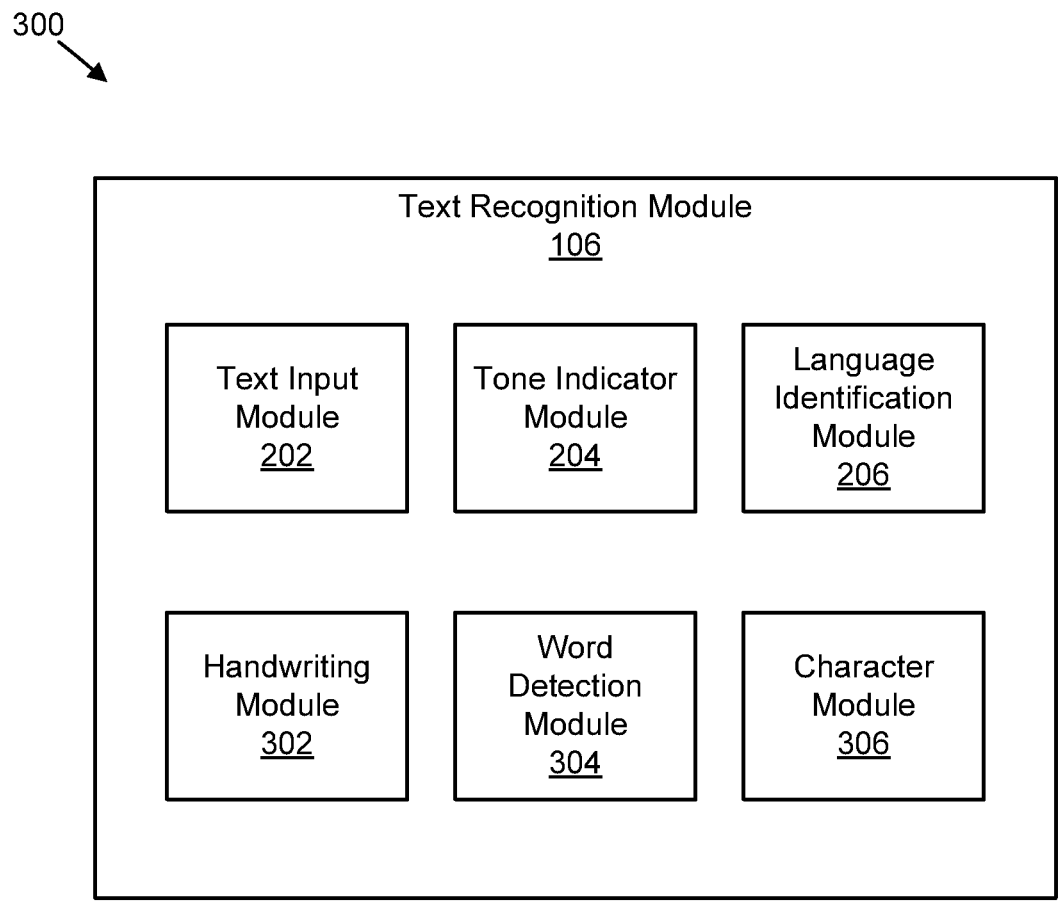
FIG. 3 is a schematic block diagram illustrating another embodiment of an apparatus for text recognition using a tone indicator.

FIG. 3 is a schematic block diagram illustrating another embodiment of an apparatus 300 for text recognition using a tone indicator, according to embodiments of the disclosure. Apparatus 300 comprises a text recognition module 106, such as the text recognition module 106 described above with reference to FIGS. 1 and 2. In general, as described above, the text recognition module 106 may receive input text, determine a tone indicator associated with the input text, and select a language recognition database based on the determined tone indicator. In the embodiments of FIG. 3, the text recognition module 106 includes a handwriting module 302, a word detection module 304, and a character module 306, in addition to the text input module 202, tone indicator module 204, and language identification module 206 described above with reference to FIG. 2.

The handwriting module 302, in one embodiment, is configured to perform handwriting recognition on the input text. For example, the handwriting module 302 may identify print words associated with the input text. In some embodiments, the handwriting module 302 analyzes handwritten input text to identify words, punctuation, and the like. In further embodiments, the handwriting module 302 identifies a print word corresponding to the handwriting and displays the corresponding print word. In some embodiments, the handwriting module 302 performs optical character recognition on the input text. In other embodiments, the handwriting module 302 identifies strokes used to input the handwriting and translates the strokes into print text.

The word detection module 304, in one embodiment, is configured to parse input text to identify words within the input text. In some embodiments, the word detection module 304 is a component of the text input module 202 and/or the tone indicator module 204. In other embodiments, the word detection module 304 operates cooperatively with the text input module 202 and/or the tone indicator module 204 to parse input text. For example, the word detection module 304 may receive unparsed text from the text input module 202 and/or the tone indicator module 204 and return parsed text. In some embodiments, the word detection module 304 also removes punctuation from the input text.

The character module 306, in one embodiment, is configured to associate the input text with a character using the selected language recognition database. For example, the input text may be a pinyin word and the character module 306 may select a Chinese character from a Chinese language recognition database corresponding to the pinyin word as described below with reference to FIGS. 4C-4D. Letters of the pinyin word may be identified and used to search the selected language recognition database to identify a corresponding Chinese character.

FIGS. 4A-4D are diagrams illustrating a user interface 400 of a system for text recognition using a tone indicator, according to embodiments of the disclosure. The user interface 400 includes a handwriting field 402, a plurality of controls 404, and a text recognition field 406. A user writes onto handwriting field 402 using, e.g., a stylus, a finger, a mouse, or the like.

Figure 4A:
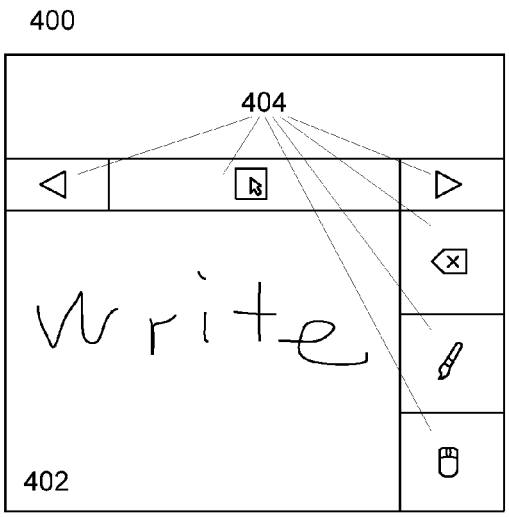
FIG. 4A is a diagram illustrating one view of a user interface of a system for text recognition using a tone indicator.
Figure 4B:
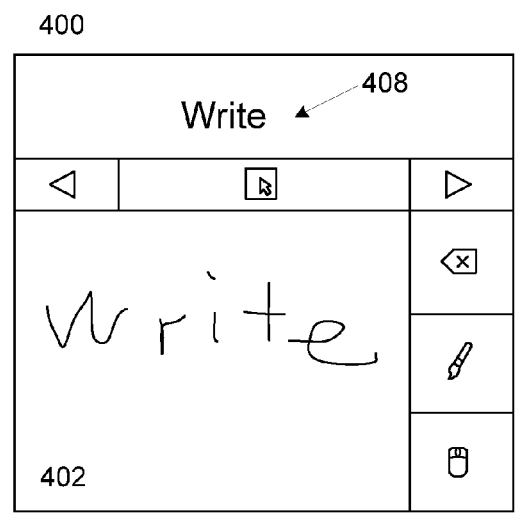
FIG. 4B is a diagram illustrating another view of the user interface of FIG. 4A.

FIG. 4A shows one embodiment of the user interface 400 where the user has written the English word "write" into the input field 402. A text recognition module, such as text recognition module 106, receives the input text and analyzes it for tone indicators. In the embodiment shown in FIG. 4A, there are no tone indicators present. Accordingly, the text recognition module 106 selects a default library or language recognition database for performing, e.g., handwriting recognition. Here, an English language recognition database is the default language recognition database and is selected for the handwriting recognition. By referring to the selected language recognition database, the text recognition module 106 determines (e.g., using the handwriting module 302) that the input characters match the word "write" and a printed text version 408 of the handwritten word is displayed in the text recognition field 406, as shown in FIG. 4B.

Figure 4C:
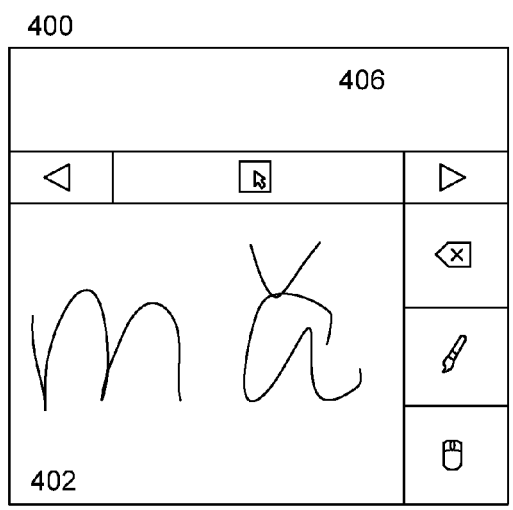
FIG. 4C is a diagram illustrating another view of the user interface of FIG. 4A.
Figure 4D:
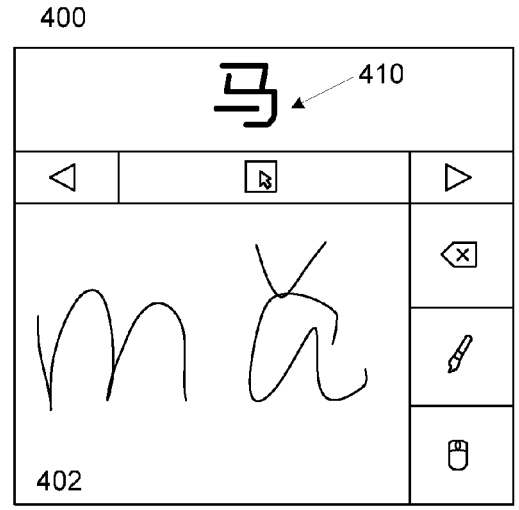
FIG. 4D is a diagram illustrating another view of the user interface of FIG. 4A.

FIG. 4C shows another embodiment of the user interface 400 where the user has written the pinyin word "mǎ" into the input field 402. Again, the text recognition module 106 receives the handwritten word and analyzes it for tone indicators. In the embodiment shown in FIG. 4C, the text recognition module 106 determines that a tone indicator is present. In certain embodiments, the text recognition module 106 identifies the tone indicator, in this case a "falling-rising" tone. Accordingly, the text recognition module 106 selects a pinyin language recognition database based on the determined tone indicator for performing, e.g., handwriting recognition. In some embodiments, the text recognition module 106 selects a particular sub-database corresponding to the identified "falling-rising" tone. By referring to the selected language recognition database, the text recognition module 106 determines (e.g., using the handwriting module 302) that the input characters match the word "mǎ" and correspond to the Chinese character "马". In FIG. 4D, a print version 410 of the corresponding Chinese character is displayed in the text recognition field 406. In some embodiments, the text recognition module 106 also displays the pinyin word "mǎ" adjacent the corresponding Chinese character.

Figure 5:
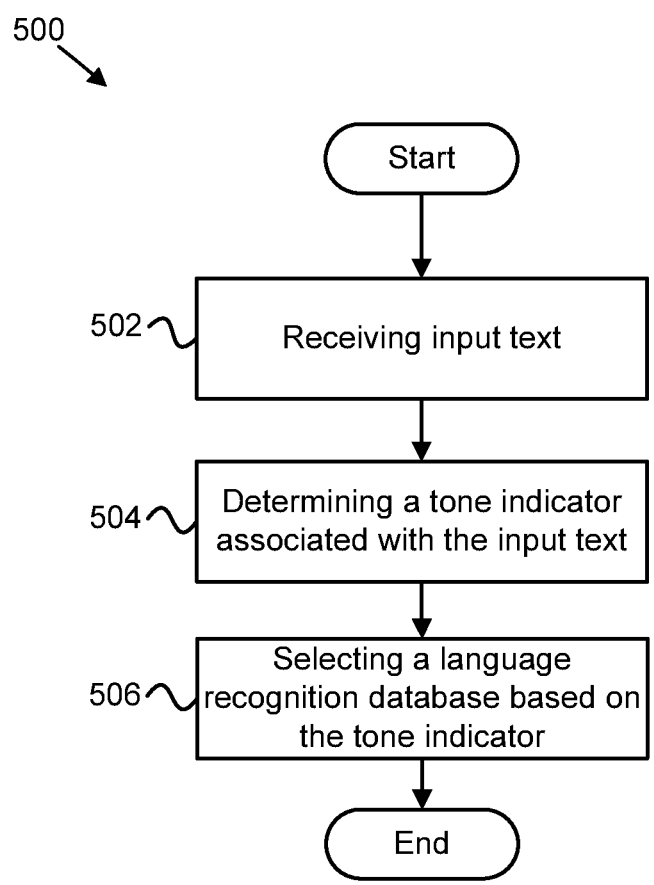
FIG. 5 is a schematic flow chart diagram illustrating one embodiment of a method for text recognition using a tone indicator.

FIG. 5 is a schematic flow chart diagram illustrating one embodiment of a method 500 for text recognition using a tone indicator, according to embodiments of the disclosure. In some embodiments, the method 500 is performed using a text recognition module, such as the text recognition module 106 described above with reference to FIGS. 1-3. In some embodiments, the method 500 is performed by a processor, such as a microcontroller, a microprocessor, a central processing unit (CPU), a graphics processing unit (GPU), an auxiliary processing unit, a FPGA, or the like.

The method 500 begins by receiving 502 input text. In some embodiments, the input text is received using a text input module, such as text input module 202. In certain embodiments, the input text is received directly from an input device, such as input device 104. In certain embodiments, the input text is received from a processor, such as processor 102. In further embodiments, the input text may be received from a networked device via the processor 102.

Next, the text recognition module determine 504 a tone indicator associated with the input text. In some embodiments, the tone indicator is determined using a tone indicator module, such as tone indicator module 204. In certain embodiments, tone indicator is a handwritten symbol associated with typed or handwritten text. In other embodiments, the tone indicator may be a typed or handwritten numeral appended to the text. In yet other embodiments, the tone indicator may be a gesture associated with the text. When determining 504 the tone indicator, a specific tone may be identified, according to some embodiments.

Next, the text recognition module selects 506 a language recognition database based on the determined tone indicator. In some embodiments, the language recognition database is selected by a language recognition module, such as language identification module 206. In certain embodiments, a sub-database of the language recognition database is selected 506 based on an identified tone indicator. For example, a pinyin language recognition database may include a plurality of sub-databases each associated with a particular tone and a sub-database may be selected 506 based whether the tone indicator matches the particular tone. The method 500 ends.

Figure 6:
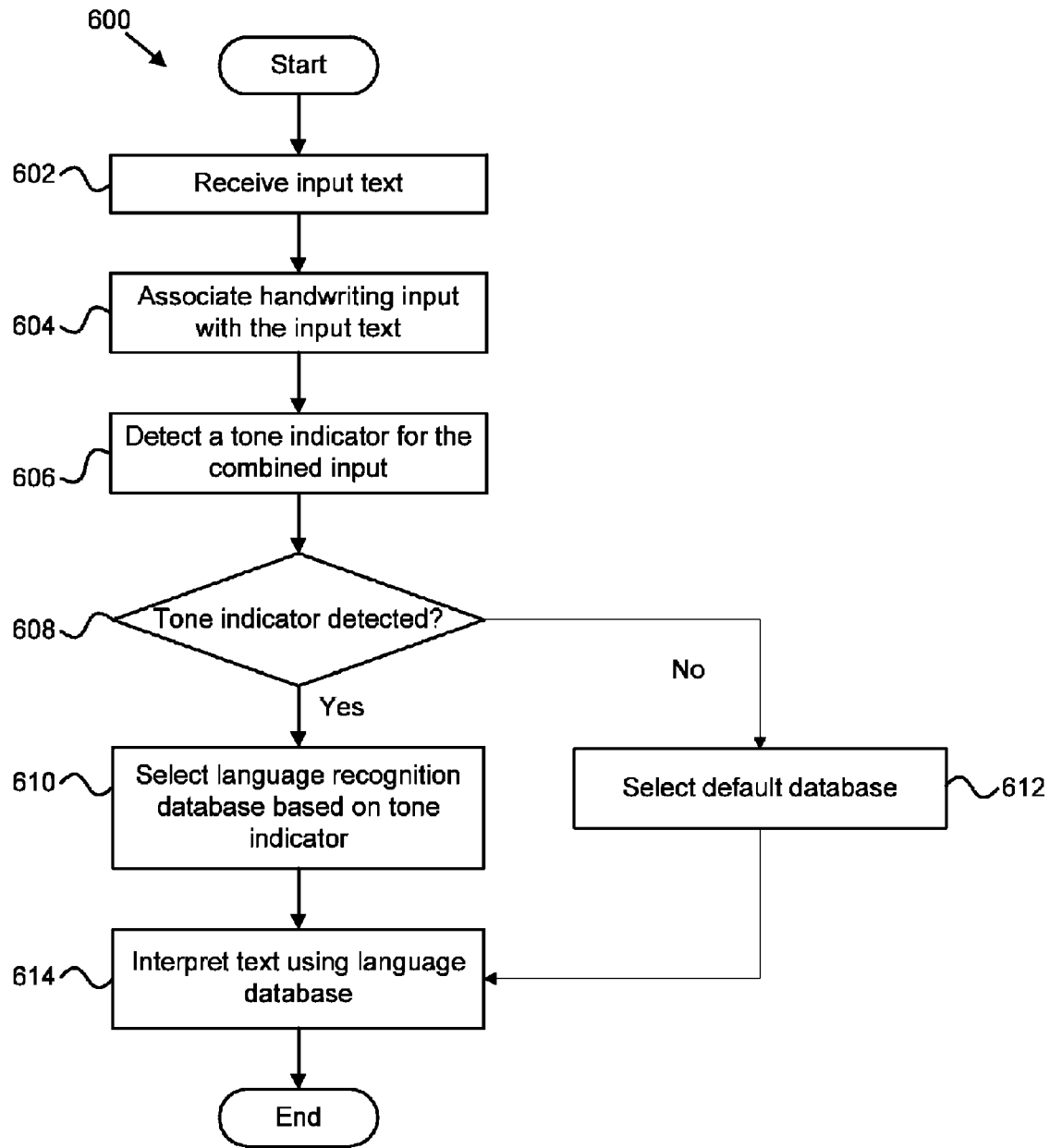
FIG. 6 is a schematic flow chart diagram illustrating another embodiment of a method for text recognition using a tone indicator.

FIG. 6 is a schematic flow chart diagram illustrating another embodiment of a method 600 for text recognition using a tone indicator, according to embodiments of the disclosure. In some embodiments, the method 600 is performed using a text recognition module, such as the text recognition module 106 described above with reference to FIGS. 1-3. In some embodiments, the method 600 is performed by a processor of a computing device, such as the electronic device 101 described above with reference to FIGS. 1-3.

The method 600 begins by receiving 602 input text. In some embodiments, the input text is received using a text input module, such as text input module 202. In certain embodiments, the input text is received directly from an input device, such as input device 104. In certain embodiments, the input text is received from a processor, such as processor 102. In further embodiments, the input text may be received from a networked device via the processor 102.

Next, the text recognition module detects 606 a tone indicator associated with the combined input. In some embodiments, the tone indicator is detected using a tone indicator module, such as tone indicator module 204. When detecting 606 the tone indicator, a specific tone may be identified, according to some embodiments.

Next, the text recognition module determines 608 whether a tone indicator was detected. If a tone indicator was detected, then the text recognition module selects 610 a language recognition database based on the detected tone indicator. In some embodiments, the language recognition database is selected by a language recognition module, such as language identification module 206. In certain embodiments, a sub-database of the language recognition database is selected 610 based on an identified tone indicator. For example, a pinyin language recognition database may include a plurality of sub-databases each associated with a particular tone and a sub-database may be selected 610 based whether the tone indicator matches the particular tone.

If no tone indicator was detected, the text recognition module selects 612 a default language recognition database. In some embodiments, the default database is user defined. In certain embodiments, the default database is automatically set as a most frequently used language recognition database.

After selecting a language recognition database, the text recognition module interprets 614 the combined text using the selected language recognition database. In some embodiments, the text recognition module performs text or handwriting recognition using the selected database. In some embodiments, the text recognition module identifies a word or character associated with the combined text using the selected database. For example, the text recognition module may identify a Chinese character corresponding to an input pinyin word as described above with reference to FIGS. 4A-4D. The method 600 ends.

Figure 7:
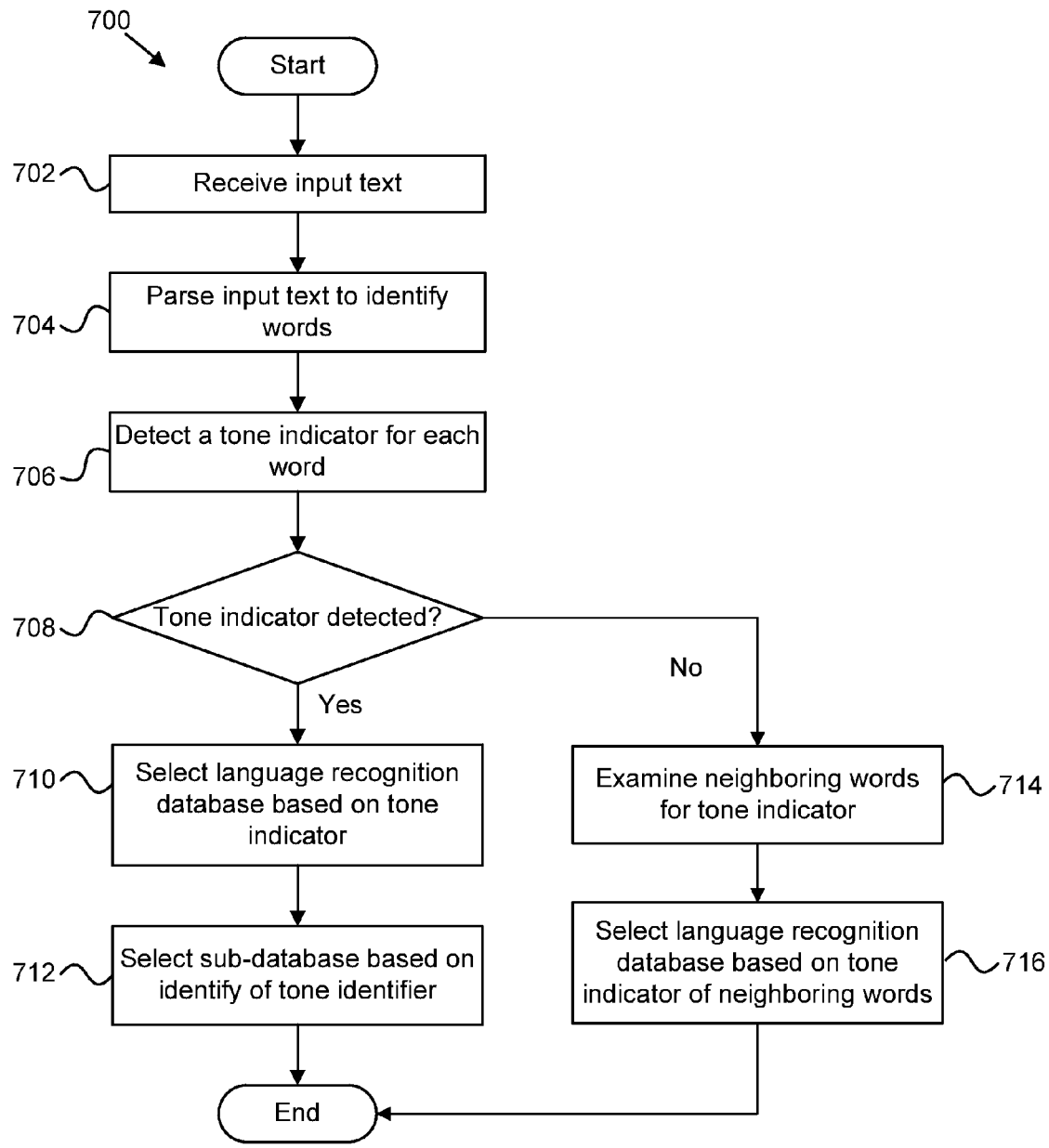
FIG. 7 is a schematic flow chart diagram illustrating another embodiment of a method for text recognition using a tone indicator.

FIG. 7 is a schematic flow chart diagram illustrating another embodiment of a method 700 for text recognition using a tone indicator, according to embodiments of the disclosure. In some embodiments, the method 700 is performed using a text recognition module, such as the text recognition module 106 described above with reference to FIGS. 1-3. In some embodiments, the method 700 is performed by a processor of a computing device, such as the electronic device 101 described above with reference to FIGS. 1-3.

The method 700 begins by receiving 702 input text. In some embodiments, the input text is received using a text input module, such as text input module 202. In certain embodiments, the input text is received directly from an input device, such as input device 104. In certain embodiments, the input text is received from a processor, such as processor 102. In further embodiments, the input text may be received from a networked device via the processor 102.

Next, the text recognition module parses 704 the input text to identify words within the input text. In some embodiments, the input text is parsed using a text input module 202 and/or a word detection module 304. Next, the text recognition module detects 706 a tone indicator associated with each word of the input text. In some embodiments, the tone indicator is detected using a tone indicator module, such as tone indicator module 204. In certain embodiments, tone indicator is a handwritten symbol associated with typed or handwritten text. In further embodiments, the tone indicator may be a typed or handwritten numeral appended to the input text. In other embodiments, the tone indicator may be a gesture associated with the input text. When detecting 706 the tone indicator, a specific tone may be identified, according to some embodiments.

Next, the text recognition module determines 708 whether a tone indicator was detected. If a tone indicator was detected, then the text recognition module selects 710 a language recognition database based on the detected tone indicator. In certain embodiments, the input text may contain words from different languages, thus a language recognition database is selected on a word-by-word basis. In some embodiments, the language recognition database is selected by a language recognition module, such as language identification module 206.

In some embodiments, the text recognition module selects 712 a sub-database of the language recognition database based on an identified tone indicator. For example, a pinyin language recognition database may include a plurality of sub-databases each associated with a particular tone and a sub-database may be selected 712 based whether the tone indicator matches the particular tone.

If no tone indicator was detected, the text recognition module examine 714 neighboring words for tone indicators. The neighboring words may be one or more words before and/or after the current word. If the neighboring words contain tone indicators, a language recognition database is selected 716 based on the tone indicators of the neighboring words. In certain embodiments, a sub-database of the language recognition database corresponding a neutral tone (i.e., without a tone indicator) is selected. However, if the neighboring words do not contain tone indicators, then a default database may be selected 716. The method ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
 a processor; and
 a memory that stores code executable by the processor to:
 receive input text, the input text including at least one word;
 determine whether a user inputs a tone indicator in association with the input text, wherein the tone indicator is selected from the group consisting of a handwritten mark, glyph, or symbol corresponding to a particular tone of a tonal language, a typed mark, glyph, or symbol corresponding to a particular tone of a tonal language, and a gesture corresponding to a particular tone of a tonal language;
 identify a particular tone associated with the input text in response to the user inputting a tone indicator for a word of the input text;
 examine one or more nearby words for tone indicator in response to the user not inputting a tone indicator for a word of the input text; and
 select a language recognition database based on the tone indicator.

2. The apparatus of claim 1, wherein the memory further comprises code executable by the processor to interpret the input text using the selected language recognition database.

3. The apparatus of claim 1, wherein the memory further comprises code executable by the processor to select a default language recognition database in response to no tone indicator being present in the input text.

4. The apparatus of claim 1, wherein the memory further comprises code executable by the processor to parse the input text to identify words within the input text, wherein the apparatus determines a tone indicator for each word within the input text.

5. The apparatus of claim 4, wherein the input text comprises words in two languages and the language recognition database is selected for each word based on the determined tone indicator for each word.

6. The apparatus of claim 1, wherein the memory further comprises code executable by the processor to perform handwriting recognition on the input text using the selected language recognition database.

7. The apparatus of claim 1, wherein the memory further comprises code executable by the processor to associate a handwritten tone indicator with typed input text.

8. The apparatus of claim 1, wherein the input text comprises a plurality of words, the apparatus further comprising code that selects the language recognition database for a particular word based in part on tone indicators determined for nearby words.

9. The apparatus of claim 1, wherein the tone indicator is selected from the group comprising a mark above a word and a numeral following a word.

10. The apparatus of claim 1, wherein the language recognition database is selected from the group consisting of an English database, a pinyin database, and a Chinese database.

11. A method comprising:
 receiving, by use of a processor, user input including input text;

determining whether the user input includes a tone indicator, wherein the tone indicator is selected from the group consisting of a handwritten mark, glyph, or symbol corresponding to a particular tone of a tonal language, a typed mark, glyph, or symbol corresponding to a particular tone of a tonal language, and a gesture corresponding to a particular tone of a tonal language;

identifying a particular tone indicator associated with the input text in response to the user input including a tone indicator for a word of the input text, wherein the tone indicator indicates a particular tone from a tonal language associated with the input text;

examining one or more nearby words for tone indicator in response to the user not inputting a tone indicator for a word of the input text; and selecting a language recognition database based on the tone indicator.

12. The method of claim 11, further comprising interpreting the input text using the selected language recognition database.

13. The method of claim 11, further comprising performing handwriting recognition on the input text using the selected language recognition database.

14. The method of claim 11, further comprising associating a handwritten tone indicator with typed input text.

15. The method of claim 11, further comprising parsing the input text to identify words within the input text, wherein determining a tone indicator comprises determining a tone indicator for each word within the input text.

16. The method of claim 15, wherein the input text comprises words in two languages and the language recognition database is selected for each word based on the determined tone indicator for each word.

17. The method of claim 11, further comprising determining a character corresponding to the input text by searching the selected language recognition database.

18. A program product comprising a non-transitory computer readable storage medium that stores code executable by a processor to perform:

receiving input text including at least one word;

determining whether a user inputs a tone indicator with the input text, wherein the tone indicator is selected from the group consisting of a handwritten mark, glyph, or symbol corresponding to a particular tone of a tonal language, a typed mark, glyph, or symbol corresponding to a particular tone of a tonal language, and a gesture corresponding to a particular tone of a tonal language;

identifying a particular tone indicator associated with the input text in response to the user inputting a tone indicator, wherein the tone indicator indicates a particular tone from a tonal language associated with the input text;

examining one or more nearby words for tone indicator in response to the user not inputting a tone indicator for a word of the input text; and selecting a language recognition database based on the tone indicator.

19. The program product of claim 18, wherein further comprising associating a handwritten tone indicator with typed input text.

20. The program product of claim 18, wherein further comprising performing handwriting recognition on the input text using the selected language recognition database.

* * * * *